United States Patent
Bogdan

(10) Patent No.: US 12,462,401 B2
(45) Date of Patent: Nov. 4, 2025

(54) OPTICAL ACOUSTIC VECTOR SENSOR

(71) Applicant: RAYTHEON COMPANY, Arlington, VA (US)

(72) Inventor: Caitlin C. Bogdan, Little Compton, RI (US)

(73) Assignee: Raytheon Company, Arlington, VA (US)

( * ) Notice: Subject to any disclaimer, the term of this patent is extended or adjusted under 35 U.S.C. 154(b) by 98 days.

(21) Appl. No.: 18/219,328

(22) Filed: Jul. 7, 2023

(65) Prior Publication Data

US 2025/0014192 A1  Jan. 9, 2025

(51) Int. Cl.
| | |
|---|---|
| *G06T 7/246* | (2017.01) |
| *G01H 3/00* | (2006.01) |
| *H04N 5/265* | (2006.01) |
| *H04N 23/56* | (2023.01) |
| *H04N 23/695* | (2023.01) |

(52) U.S. Cl.
CPC .............. *G06T 7/246* (2017.01); *G01H 3/00* (2013.01); *H04N 5/265* (2013.01); *H04N 23/56* (2023.01); *H04N 23/695* (2023.01); *G06T 2207/20212* (2013.01)

(58) Field of Classification Search
CPC . G06T 7/246; G06T 2207/20212; G06T 7/20; G01P 5/26; G01P 5/20; H04N 23/695; H04N 23/56; H04N 5/265; G01H 3/00
USPC ......................................................... 348/135
See application file for complete search history.

(56) References Cited

U.S. PATENT DOCUMENTS

| | | | |
|---|---|---|---|
| 3,738,248 A | 6/1973 | Fish et al. | |
| 4,105,990 A | 8/1978 | Rines et al. | |
| 6,159,149 A | 12/2000 | Erikson et al. | |
| 6,700,833 B2 | 3/2004 | Erikson | |
| 6,829,197 B2 | 12/2004 | Erikson | |
| 10,042,038 B1* | 8/2018 | Lord | G10L 25/51 |
| 11,435,428 B2 | 9/2022 | Collins | |
| 2008/0137913 A1 | 6/2008 | Hildreth | |
| 2010/0002076 A1 | 1/2010 | Welker et al. | |

(Continued)

FOREIGN PATENT DOCUMENTS

| | | |
|---|---|---|
| CN | 111458532 | 7/2020 |
| CN | 106414772 B | 2/2021 |

(Continued)

OTHER PUBLICATIONS

Wadhwa et al., "Phase-Based Video Motion Processing", Publication Date: Jul. 2013, ACM Transactions on Graphics, vol. 32, No. 4, Article 80. (Year: 2013).*

(Continued)

*Primary Examiner* — Thai Q Tran
*Assistant Examiner* — Nienru Yang
(74) *Attorney, Agent, or Firm* — Schwegman Lundberg & Woessner, P.A.

(57) ABSTRACT

Systems and methods for measuring acoustic wave vectors in a fluid is presented, a system comprising: a first camera configured to be placed in the fluid; a second camera configured to be placed in the fluid; a light source configured to be placed in the fluid; and a controller configured to: control the first camera; control the second camera; control the light source; process images provided by the first camera and second camera to determine an acoustic wave vector.

20 Claims, 5 Drawing Sheets

(56) References Cited

U.S. PATENT DOCUMENTS

| | | |
|---|---|---|
| 2011/0007606 A1 | 1/2011 | Curtis |
| 2014/0320666 A1 | 10/2014 | Badawy et al. |
| 2018/0150965 A1* | 5/2018 | Milne ..................... G06T 7/246 |
| 2018/0299478 A1 | 10/2018 | Lüthi et al. |
| 2020/0202572 A1 | 6/2020 | Wieneke |

FOREIGN PATENT DOCUMENTS

| | | |
|---|---|---|
| JP | 2017166936 | 9/2017 |
| WO | WO-2016068715 A1 * | 5/2016 ............... B63C 7/26 |

OTHER PUBLICATIONS

"International Application Serial No. PCT US2024 036542, International Search Report mailed Oct. 11, 2024", 5 pgs.
"International Application Serial No. PCT US2024 036542, Written Opinion mailed Oct. 11, 2024", 11 pgs.
Neal, Wadhwa, "Phase-based video motion processing", ACM Transactions On Graphics, vol. 32, No. 4, (Jul. 1, 2013), 9 pgs.
Wadhwa et al., "Phase-Based Video Motion Processing," MIT Computer Science and Artificial Intelligence Lab, SIGGRAPH (2013).

\* cited by examiner

OPTICAL ACOUSTIC VECTOR SENSOR

BACKGROUND

Vector sensors measure the motion of objects in one or more dimensions. For example, cantilever vector sensors can measure the force exerted by fluid (such as air or water) as the fluid moves around the sensor, and can transform the forces the sensor experiences into measurements of an object's velocity in the fluid.

SUMMARY

According to at least one aspect of the present disclosure a system for measuring acoustic wave vectors in a fluid is presented, the system comprising: a first camera configured to be placed in the fluid; a second camera configured to be placed in the fluid; a light source configured to be placed in the fluid; and a controller configured to: control the first camera; control the second camera; control the light source; process images provided by the first camera and second camera to determine an acoustic wave vector.

In some examples, processing images to determine an acoustic wave vector includes: receiving one or more first images of a scene from the first camera, each image corresponding to a first perspective; and receiving one or more second images of the scene from the second camera, each image corresponding to a second perspective. In various examples, processing images to determine an acoustic wave vector includes: decomposing the one or more first and second images into a plurality of subbands; amplifying a phase of at least one subband of the plurality of subbands; and combining one or more of the plurality of subbands into one or more third images. In many examples, processing images to determine an acoustic wave vector includes: identifying one or more particulates in the third images; responsive to identifying the one or more particulates, determining motion of the one or more particulates; and based on the motion of the one or more particulates, determining an acoustic wave vector corresponding to at least one of the one or more particulates. In various examples, the second camera is rotated relative to the first camera. In many examples, the second camera is rotated 90 degrees relative to the first camera. In some examples, the light source is configured to selectively provide light to a scene. In various examples, the light is adequate to illuminate at least one particulate in the scene.

According to at least one aspect of the present disclosure, an acoustic vector sensor (AVS) is presented, comprising: a plurality of high-definition video cameras, each configured to be used in fluid to record over a small area any movement of at least one particle suspended in the fluid so as to record any object movement in response to any disturbance of the fluid by an acoustic wave within the small area between the video cameras; and a processing device configured to process images of the particles to determine an acoustic intensity vector of the acoustic wave based on the measured movement of the particle In some examples, the AVS further comprises a source of light to illuminate the at least one particle. In some examples, the video cameras are configured for use in fluid. In various examples, the processing device is configured to process the images to determine an acoustic wave vector includes: receiving one or more first images of a scene from a first camera, each image corresponding to a first perspective; receiving one or more second images of the scene from a second camera, each image corresponding to a second perspective; decomposing the one or more first and second images into a plurality of subbands; amplifying a phase of at least one subband of the plurality of subbands; combining one or more of the plurality of subbands into one or more third images; identifying one or more particulates in the third images; responsive to identifying the one or more particulates, determining motion of the one or more particulates; and based on the motion of the one or more particulates, determining an acoustic wave vector corresponding to the motion of at least one of the one or more particulates. In many examples, the AVS further comprises a controller configured to control a first camera and a second camera, and control the light source.

According to at least one aspect of the present disclosure, a method of determining an acoustic wave vector is presented, the method comprising: controlling a light source to illuminate a volume of a fluid; controlling a first camera to capture one or more first images of the volume; controlling a second camera to capture one or more second images of the volume; and process the one or more first images and the one or more second images to determine an acoustic wave vector of at least one particulate in the volume of the fluid.

In some examples, processing the one or more first images and the one or more second images further comprises: decomposing the one or more first images and the one or more second images into a plurality of subbands; amplifying a phase of at least one subband of the plurality of subbands; and combining one or more of the subbands of the plurality of subbands into one or more third images. In various examples, processing the one or more first images and the one or more second images further comprises: identifying one or more particulates in the one or more third images; responsive to identifying the one or more particulates, determining motion of the one or more particulates; and based on the motion of the one or more particulates, determining an acoustic wave vector corresponding to the one or more particulates. In many examples, the acoustic wave vector is determined at least in part by determining a vector based on a first position of at least one of the one or more particulates and a second position of the at least one of the one or more particulates, wherein the first position corresponds to a first time and the second position corresponds to a second time after the first time.

According to at least one aspect of the present disclosure, a method of determining an acoustic wave vector is provided, the method comprising: controlling a plurality of video cameras to capture one or more images of particulates located within a volume of fluid; amplifying any motion of the particulates caused by an acoustic wave within the volume of the fluid; and determining an acoustic intensity vector of the acoustic wave based on amplified motion of the particulates and at least two of the one or more images.

In various examples, the method further comprises activating a light source to illuminate at least one of the particulates. In some examples, the method further comprises decomposing the one or more first and second images into a plurality of subbands; amplifying a phase of at least one subband of the plurality of subbands; combining one or more of the plurality of subbands into one or more third images; identifying one or more particulates in the third images; responsive to identifying the one or more particulates, determining motion of the one or more particulates; and based on the motion of the one or more particulates, determining an acoustic wave vector corresponding to the motion of at least one of the one or more particulates.

BRIEF DESCRIPTION OF THE DRAWINGS

Various aspects of at least one embodiment are discussed below with reference to the accompanying figures, which are not intended to be drawn to scale. The figures are included to provide an illustration and a further understanding of the various aspects and embodiments, and are incorporated in and constitute a part of this specification, but are not intended as a definition of the limits of any particular embodiment. The drawings, together with the remainder of the specification, serve to explain principles and operations of the described and claimed aspects and embodiments. In the figures, each identical or nearly identical component that is illustrated in various figures is represented by a like numeral. For purposes of clarity, not every component may be labeled in every figure. In the figures:

DETAILED DESCRIPTION

Figure 1:
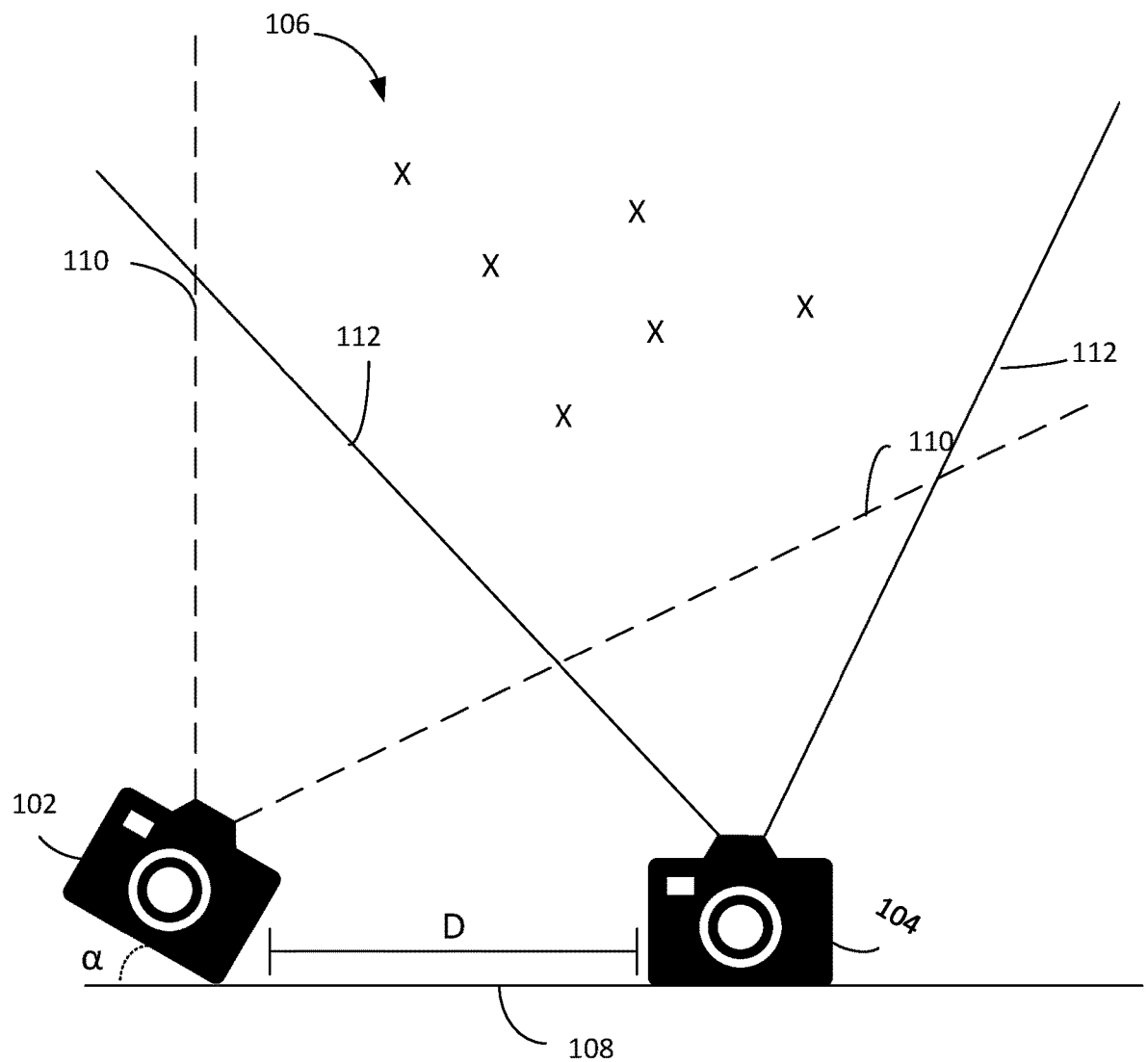
FIG. 1 illustrates an optical acoustic vector sensor according to an example.

Examples of the methods and systems discussed herein are not limited in application to the details of construction and the arrangement of components set forth in the following description or illustrated in the accompanying drawings. The methods and systems are capable of implementation in other embodiments and of being practiced or of being carried out in various ways. Examples of specific implementations are provided herein for illustrative purposes only and are not intended to be limiting. In particular, acts, components, elements and features discussed in connection with any one or more examples are not intended to be excluded from a similar role in any other examples.

Also, the phraseology and terminology used herein is for the purpose of description and should not be regarded as limiting. Any references to examples, embodiments, components, elements or acts of the systems and methods herein referred to in the singular may also embrace embodiments including a plurality, and any references in plural to any embodiment, component, element or act herein may also embrace embodiments including only a singularity. References in the singular or plural form are not intended to limit the presently disclosed systems or methods, their components, acts, or elements. The use herein of "including," "comprising," "having," "containing," "involving," and variations thereof is meant to encompass the items listed thereafter and equivalents thereof as well as additional items.

References to "or" may be construed as inclusive so that any terms described using "or" may indicate any of a single, more than one, and all of the described terms. In addition, in the event of inconsistent usages of terms between this document and documents incorporated herein by reference, the term usage in the incorporated features is supplementary to that of this document; for irreconcilable differences, the term usage in this document controls.

Acoustic vector sensors, such as the sensors described in U.S. Pat. No. 11,435,258, which is incorporated by reference in its entirety for all purposes, feature a plurality of solenoids that magnetically levitate an object. When the object is acted upon by an outside force, the magnetic fields of the solenoids are distorted and the currents and voltages experienced by the solenoids may change. By measuring these changes or distortions in the currents or voltages of the solenoids, the motion of the object can be determined, and thus the effects of waves in the environment can be derived based on the motion of the object. Cantilever vector sensors work on similar principles, using pressure sensors to detect changes in pressure. However, cantilever vector sensors require three sensors (one for each basis dimension of space).

The present disclosure describes using optical cameras under water (or in other relatively dense fluids) to measure the motion of particles in the water and derive the characteristics of the forces (e.g., the waves) causing the motion of the particles. Algorithms that amplify motion in images captured by the cameras are used to derive the motion of particles, which can be used to build a model of the forces acting in (and on) the water. Unlike traditional methods of vector sensing, only two camera inputs (for example, two cameras or a camera with two lenses) are used by this method, while traditional cantilever approaches require at least three sensors, and magnetic field approaches require generating and maintaining magnetic fields. The methods and apparatuses described herein are suitable for use measuring particle motion of particles on the microscopic scale or larger. Aspects of this disclosure also relate to how a camera can be used to measure particles even in the depths of the sea (or within other dark fluids) where light from natural sources may be unavailable. Aspects of this disclosure discuss measuring acoustic vectors are measurements or expressions of small-scale vibratory motion of particles, in contrast to things like overall velocity, which is a measure of movement of a particle over a relatively large scale and distance.

FIG. 1 illustrates an optical acoustic-vector sensor 100 ("vector sensor 100") according to an example. The vector sensor 100 includes a first camera 102 and a second camera 104. FIG. 1 also includes a plurality of particulates 106 ("particulates 106"), a first trace 108, a second trace 110, and a third trace 112. FIG. 1 also shows an angle, a, and a distance, D.

The first trace 108 represents a surface or plane that is parallel to the plane of the input (e.g., the lens) of the second camera 104. The value of the angle, a, may be determined relative to the first trace 108. The second trace 110 represents the field of view of the first camera 102. The third trace 112 represents the field of view of the second camera 104. The distance, D, represents the distance between the first camera 102 and second camera 104. The angle, a, represents the angle of the first camera 102 relative to the first trace 108.

The first camera 102 is positioned a distance D from the second camera 104. The distance D may be predetermined or known. The distance D may have components in multiple dimensions (that is, D may be defined as a vector, such that the position of the first camera 102 relative to the second camera 104 may be anywhere in 3-dimensions). For example, if the cameras 102, 104 are located on the same chassis or circuit, the distance from the first to second cameras 102, 104 may be a fixed amount, and thus D would be a fixed length in a fixed direction. The first camera 102 is positioned at an offset from the first trace 108 by the angle, a. Put another way, the plane of the input of the first camera 102 (e.g., the plane of lens of the first camera 102) intersects the plane of the input of the second camera 104 at the angle α. The angle α may be predetermined, fixed, or configurable such that the angle α may be known. In at least some examples, the distance, D, is known, as is any angle or offset between the two cameras 102, 104.

The second camera 104 is positioned a distance D from the first camera 102. The second camera 104 is parallel to the first trace 108 (that is, the plane of the input of the second camera 104 is parallel to the plane of the first trace 108 and intersects the plane of the input of the first camera 102 at the angle α).

Cameras, such as the first camera 102 and second camera 104, can produce images. In general, images are two dimensional representations (or projections) of 3-dimensional space. Because the characteristics of each camera 102, 104 is known, and because the distance D and angle α between the two cameras 102, 104 is known, it is possible to determine the position in 3-dimensions of the particulates 106. In principle, by taking the distance D and direction (relative to a fixed point of reference) of the second camera 102 from the first camera 104, and taking the angle α of the first camera 102 relative to the first trace 108, by using trigonometric transformations the coordinate position relative to the fixed point of reference of a given particulate of the particulates 106 can be derived. Thus, the relative locations of the particulates 106 in the fluid can be determined, and the motion of those particulates 106 may be derived.

Figure 2:
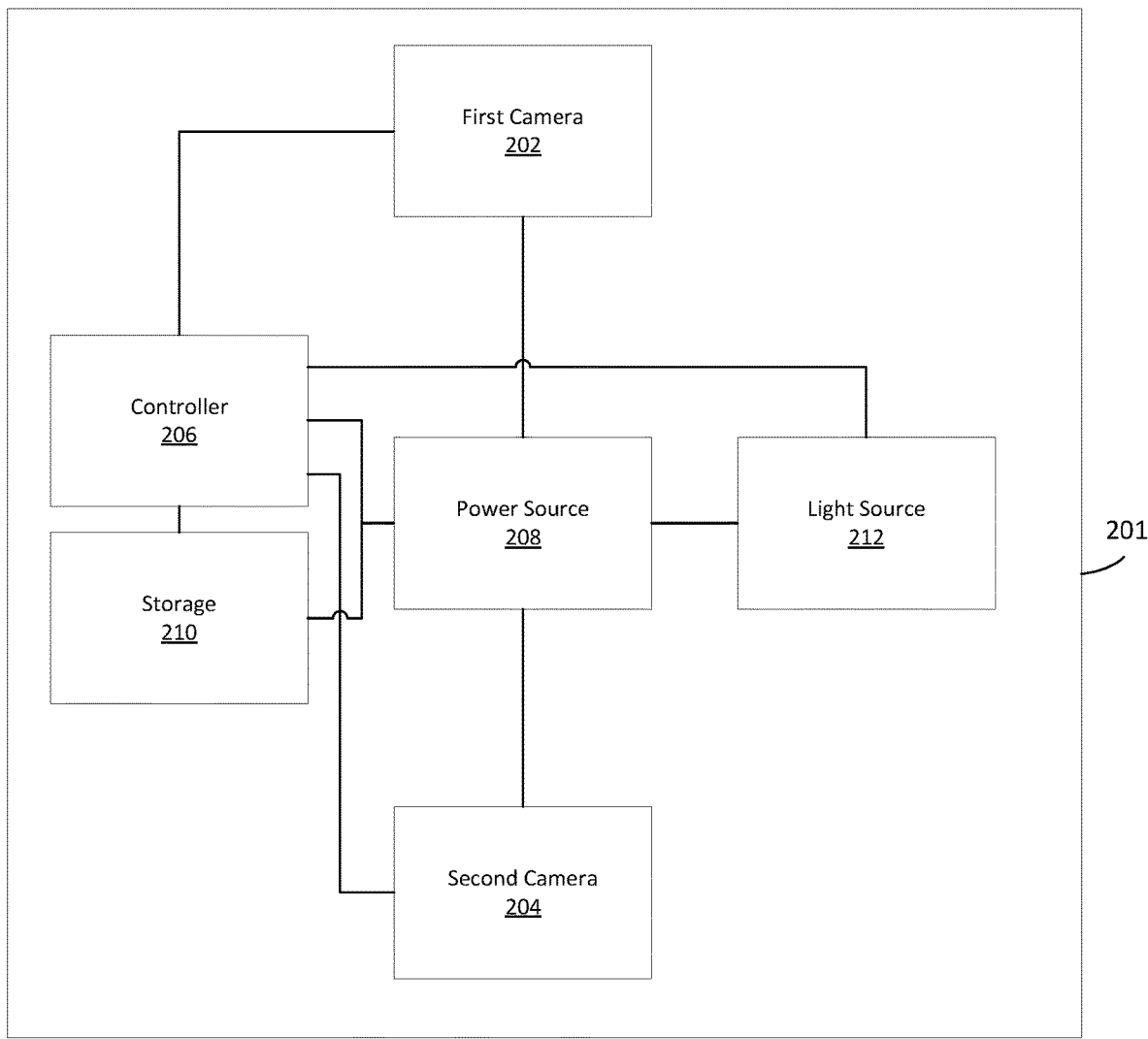
FIG. 2 illustrates a circuit for determining acoustic vectors according to an example.

FIG. 2 illustrates a circuit 200 capable of deriving acoustic vectors of fluids according to an example. The circuit 200 includes a first camera 202, a second camera 204, a controller 206, a power source 208, storage 210, and light source 212. Each component of the circuit 200 (e.g., the cameras 202, 204, at least one controller 206 ("controller 206"), power source 208, storage 210, and light source 212 as well as any other components) may be located on a substrate 201.

The substrate 201 may be quite small, as may the components coupled to the substrate 201. For example, the substrate 201 may have a footprint of 1 cm$^2$. Conversely, the substrate 201 may have a footprint even smaller than 1 cm$^2$, or may have a footprint larger than 1 cm$^2$. In some embodiments, the substrate 201 may have a footprint of approximately 5 cm$^2$. In general, the components (e.g., the cameras 202, 204, controller 206, storage 210, and so forth) may be as small as possible. In some examples, the cameras 202, 204 need not be located on the substrate 201, but may instead be coupled to the substrate 201 (e.g., via wires), but otherwise be separate from the substrate 201. Even more generally, in some examples, no substrate 201 is necessary, and each component may be separate from each other component, and coupled together using an intermediary, such as a wire.

The first camera 202 is coupled to the controller 206 and to the power source 208. The second camera 204 is coupled to the controller 206 and to the power source 208. The controller 206 is coupled to the first camera 202, the second camera 204, the power source 208, and the storage 210. The storage 210 is coupled to the power source 208 and the controller 206. The light source 212 is coupled to the power source 208 and to the controller 206.

The first camera 202 may be located at a first position on the substrate 201. The first camera 202 may be a camera capable of taking still images or sequences of images (e.g., video). The first camera 202 may be configured to draw power from the power source 208, and may be controlled by the controller 206. Images created by the first camera 202 may be stored in the storage 210.

The second camera 204 may be located a second position on the substrate 201. The second camera 204 may be a camera capable of taking still images or sequences of images (e.g., video). The second camera 204 may be configured to draw power from the power source 208, and may be controlled by the controller 206. Images created by the second camera 204 may be stored in the storage 210.

The physical relationship between the first and second cameras 202, 204 may be known. That is, the distance between the cameras 202, 204, the offset of the cameras 202, 204 from one another, and so forth. The camera attributes of each camera 202, 204 may also be known. Camera attributes may include field of view, resolution, zoom level, magnification level, frame rates for video or time between still images, any processing or post-processing adjustments applied to the images recorded by the cameras 202, 204 (e.g., sharpness, saturation, color adjustments, contrast, distortion adjustments, and so forth), and so forth. In some examples, the cameras 202, 204 may be capable of providing resolutions and/or zoom levels sufficient to provide images of particulates as small or smaller than grains of sand. For example, the cameras 202, 204 may be capable of providing imagery of microscopic organisms.

The power source 208 may be a battery or a power port (e.g., a plug), and may be configured to provide power to circuit components located on the substrate 201. For example, the power source 208 may provide power to the cameras 202, 204, controller 206, storage 210, and so forth. The power source 208 may include protection circuitry to prevent fault conditions (e.g., overcurrent conditions, overvoltage conditions, surge protection, harmonic smoothing, and so forth).

The storage 210 may be any type of media capable of storing images and/or data produced by the controller 206. For example, the storage 210 may be solid state memory, spinning disk memory, or any other type of digital memory. In some examples, the storage 210 may be analog memory (e.g., tapes).

The light source 212 may be a device capable of emitting light. For example, the light source 212 may be a light emitting diode or a filament, and so forth. The light source 212 may provide only enough light to illuminate the scene. As with FIG. 3, the term "scene" means the volume or portion of space visible to at least two cameras (e.g., the first camera 202 and the second camera 204). The scene may be small or large, but will generally be small. When the particulates are the size of a grain of sand (or even smaller), the scene may be correspondingly small. For example, if a particulate is 1 mm in diameter, the scene may be 10 or a 100 mm$^3$ or some other size large enough to capture the particulate and the motion of the particulate relative to the cameras 202, 204. Because the cameras 202, 204 (and indeed, potentially the entire substrate 201) may be submerged in a fluid (e.g., in a waterproof case underwater), the light source 212 may provide only a small amount of light, enough to illuminate the small area of the scene captured by the cameras. Thus, in at least some examples, the light source 212 may provide a light level of very few lumens (e.g., less than 1 lumen, less than 10 lumens, and so forth). However, the light source 212 is not limited to providing only low levels of light, and may provide considerable amounts of light (e.g., 1000$s$ of lumens). The light source 212 may provide light of one or more frequencies or wavelengths, whether visible or invisible to the human eye.

The controller 206 may be a circuit configured to control the circuit 200. For example, the controller 206 may be one or more processors, microcontrollers, ASICs, FPGAs, and so forth. The controller 206 can execute computer instructions to determine the location and movement of particulates captured in images by the cameras 202, 204. The controller 206 may run algorithms that identify particulates in images, identify motion of the particulates in the images, identify or amplify distortions in the images that are caused by motion of the particulates, and may derive acoustic vectors and other motion vectors related to the motion of the particulates captured in the images.

Figure 3:
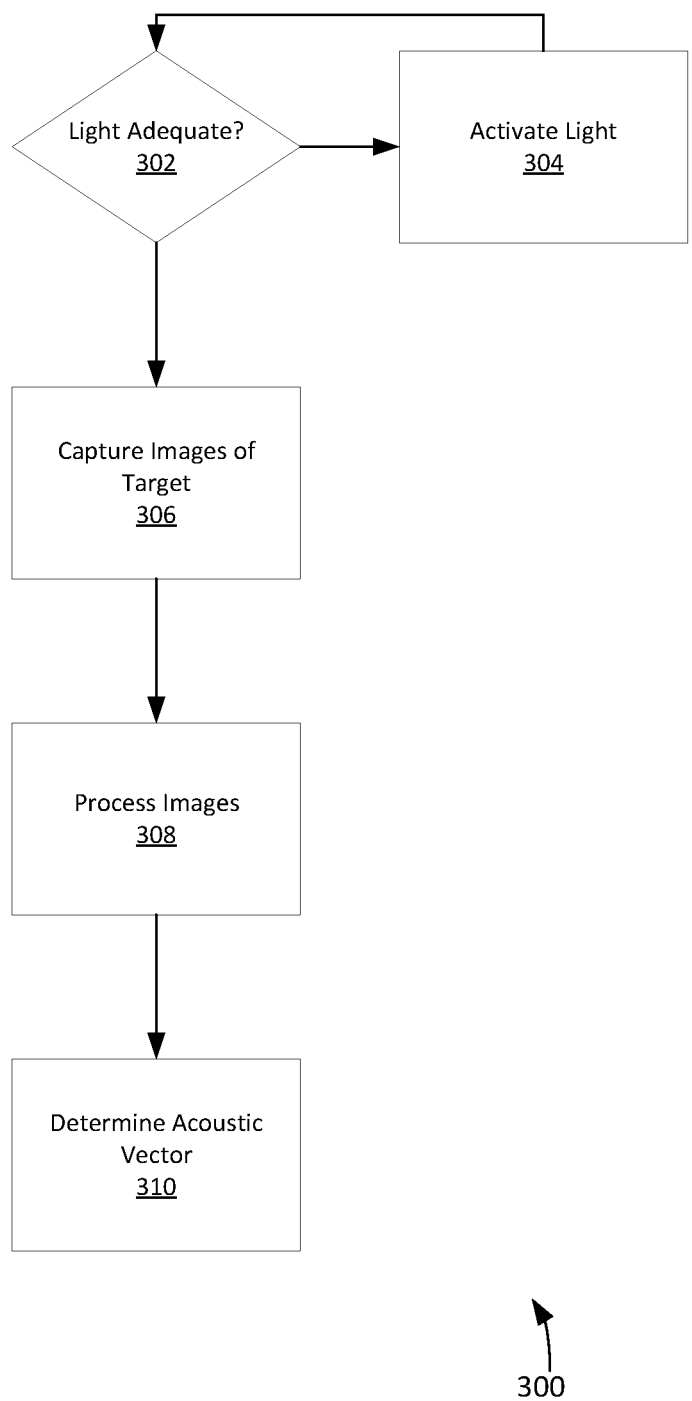
FIG. 3 illustrates a process for determining an acoustic vectors according to an example.

FIG. 3 illustrates a process 300 by which an acoustic vector may be determined using images, of particulates, captured in a fluid. In some examples, the process 300 may be executed by one or more controllers (such as the controller 206 of FIG. 2).

At act 302, the controller determines whether the lighting providing to the scene is adequate. If the controller determines that the lighting is not adequate (302 NO), the process 300 continues to act 304. If the controller determines that the lighting is adequate (302 YES), the process 300 continues to act 306. In this context, the term "scene" means at least a partial volume of the space visible to a first camera (e.g., the first camera 102 of FIG. 1) and a second camera (e.g., the second camera 104 of FIG. 1). In some example, the scene may be very small, for example, a cubic meter, centimeter, millimeter, micrometer, nanometer, and so forth. In some examples, the scene may be large enough to contain at least one particulate the size of a grain of sand or smaller. In some examples, the controller may utilize a light sensor to determine whether the scene is adequately lit, and may determine that the scene is not adequately lit (302 NO) if the light level detected by the sensor is below a threshold light level. In some examples, the controller may determine that the scene is not adequately lit (302 NO) if the light source is not activated. That is, if the light source is not on the controller may deem the scene to be inadequately lit. In some examples, the controller may determine that the scene is adequately lit (302 YES) if the light sensor detects a light level above a threshold light level and/or if the light source is activated. That is, in some examples, the controller may deem the scene adequately lit if the light source is on.

At act 304, the controller controls the light source to activate and provide light. The light source may be a spotlight, a flashlight, a lightbulb, a light-emitting diode, or any other type of light source. The emitted light may fall within the spectrum of light visible to the human eye, or may fall within the spectrum of light invisible to the human eye. In some examples, the light source may provide a dim light. For example, small particulates that are near to the lenses of each camera may not require a high level of illumination to be captured by the cameras. Therefore, in some examples it is acceptable and even preferably to use a dim light source or a light source that emits relatively little light. In some examples, the light may only need to be bright enough to illuminate the scene or a portion of the scene. For example, the average grain of sand is approximately 50 µm in diameter. Accordingly, the scene might be 1 cubic millimeter or centimeter. For smaller objects, the scene may be correspondingly smaller, and the light source may be selected and positioned to illuminate only the scene and little or no additional volume beyond the scene.

At act 306, the controller may control at least one of the cameras to capture images of the scene. The captured images may be still images or video images. The controller may set any configurable camera attribute prior to capturing an image (for example, the controller may set the frame rate to a desired value). The images may be stored for later processing and/or directly processed. The process 300 may then continue to act 308.

At act 308, the controller may process stored or concurrent images. For example, the controller may process stored images in an order (e.g., the order the images were captured), or may process the images as the images are captured. The controller may process the images to amplify motion present in the images, and may store modified images or data associated with the modified images that is indicative of the motion of the particulates in the fluid. The process 300 may then continue to act 310.

At act 310, the controller may determine an acoustic vector based on the processed images and/or associated data. One approach to determining the acoustic vector will be discussed with respect to FIG. 4, below.

With respect to acts 308 and 310, the controller may use any method to determine motion in the image, including the Lagrangian approach, the Eulerian approach, and/or the Eulerian approach without computation of flow vectors. One possible example of acts 308 and 310 is discussed with respect to FIG. 4.

Figure 4:
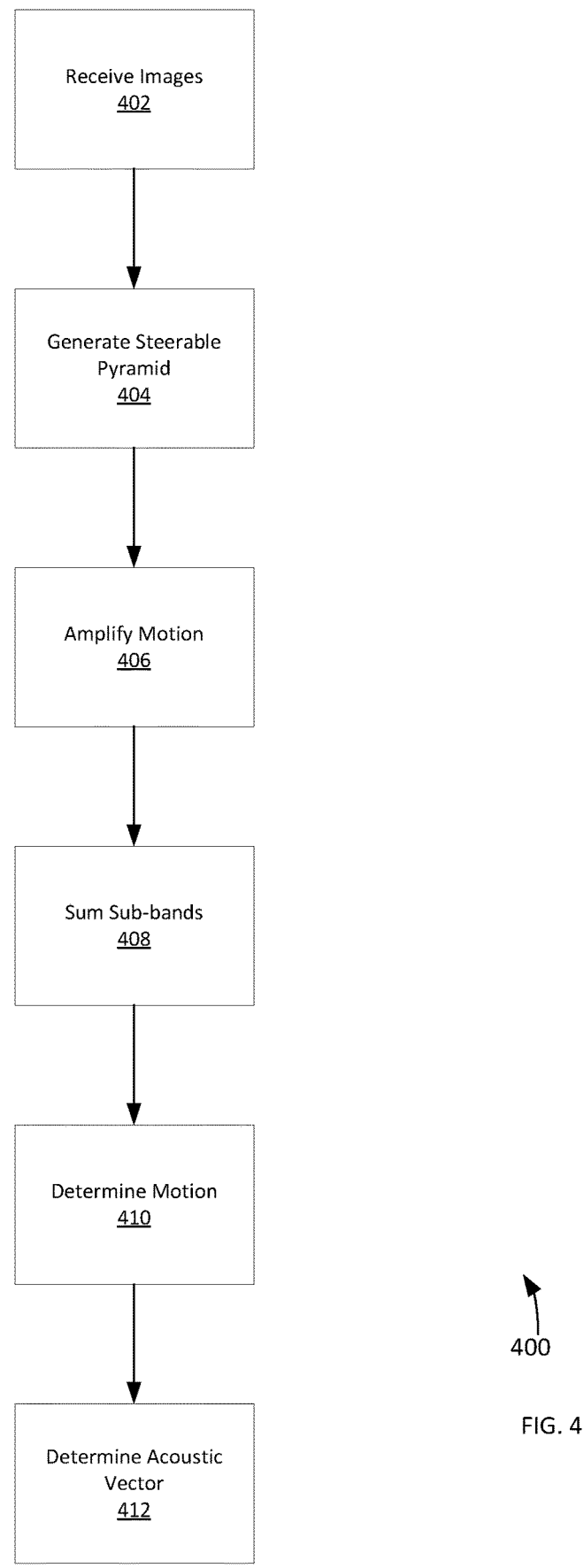
FIG. 4 illustrates a process for amplifying motion in images according to an example.
Figure 5:
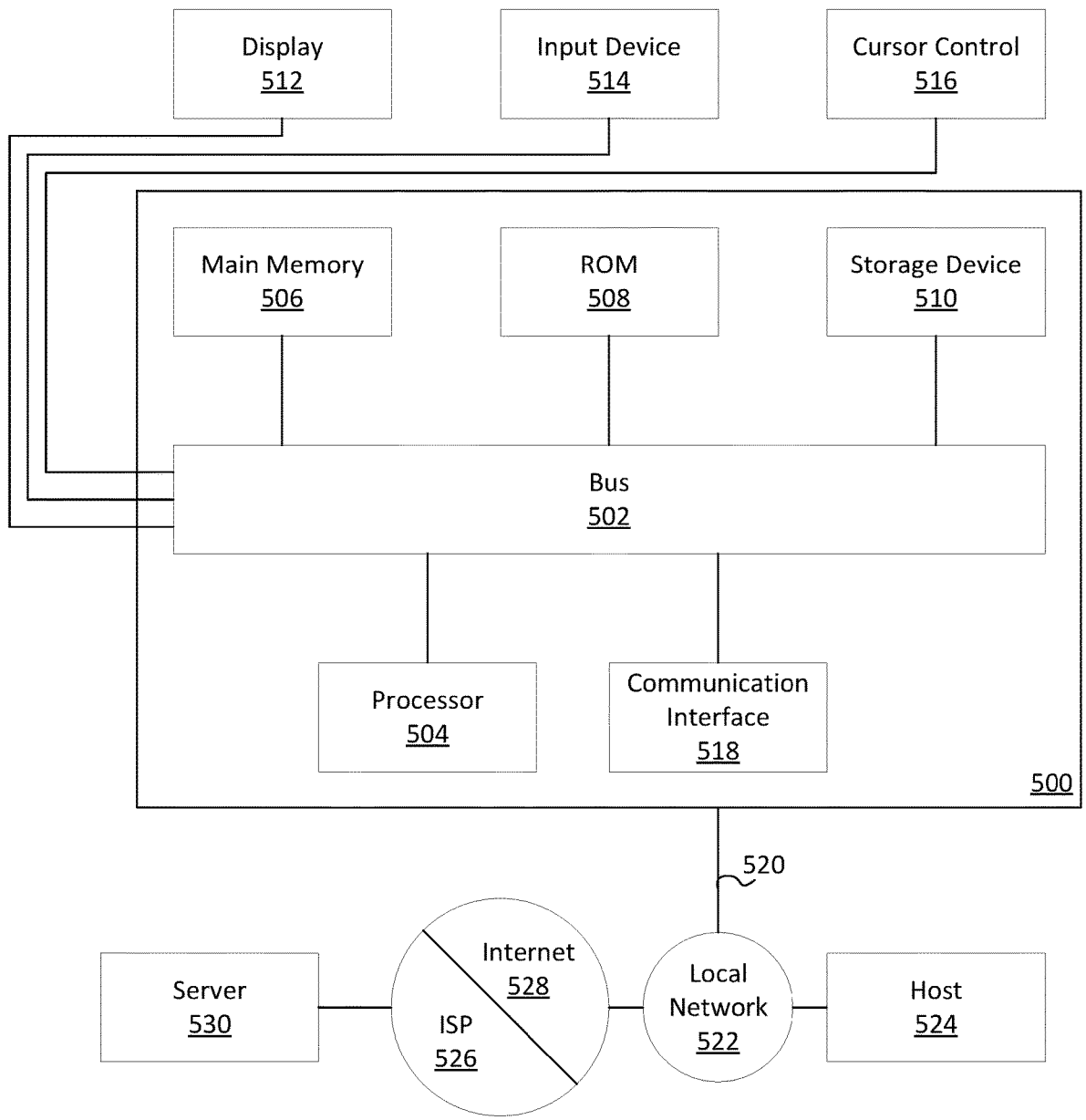
FIG. 5 illustrates a computer system according to an example.

FIG. 4 illustrates an example of a process 400 by which one or more controllers (such as the controller 206 of FIG. 2) may determine an acoustic vector using images. In particular, the process 300 uses elements of the methods described in Freeman, et al, Phase-Based Video Motion Processing, MIT Computer Science and AI Lab, which is incorporated by reference in its entirety into the present disclosure. However, other methods (e.g., Lagrangian, Eulerian with computation of flow vectors, and so forth) may also be used. In some examples, the process 400 may be part of acts 308 and 310 of the process 300 of FIG. 3.

At act 402, the controller receives one or more images. The received images may be retrieved from memory or storage, or the received images may be images captured by a camera or similar device. The images may be part of a video stream or other collection of images. The process 400 may then continue to act 404.

At act 404, the controller generates a steerable pyramid using one or more of the images. The steerable pyramid may be an overcomplete transformation of the images according to spatial scale, orientation, and/or position. The transformation used to create the steerable pyramid may have basis functions and may be limited by an envelope function. The steerable pyramid may include both real and imaginary components represented by trigonometric functions. The transformation may include transfer functions applied to discrete Fourier transformations. The result of applying the transformations may produce different spatial frequency bands (sometimes referred to as subbands) and related functions based on the images. For example, the original image may be decomposed into one or more images (or data representative of some or all of the original image). The one or more images may correspond to respective subbands. The process 400 may then continue to act 406.

At act 406, the controller magnifies and/or amplifies motion in the images. In some examples, the motion in the images is magnified and/or amplified or otherwise adjusted by adjusting the phase of the spatial frequency bands and related functions of act 404. In some examples, the motion in the images can be amplified by a factor of (1+n), where n is a real number. The value of n may be related to and/or based on the modification of the phase of the subbands and related functions (e.g., the decomposed elements of the image). The value of n may be positive or negative, and thus could be used to amplify or attenuate motion in the images. For example, for a set of the subbands including at least one of the subbands, the phase of the subband may be modified by (1+n) such that the phase is increased, which amplifies motion in the image in at least some examples. Not all subbands may be relevant. Some subbands can be attenuated or eliminated (e.g., filtered) using, for example, bandpass, low-pass, or high-pass filtering. The process 400 may then continue to act 408.

At act 408, the subbands and/or related functions of act 406 are summed together by the controller to reconstruct the images. The modified phases produced in the summing process represent motion in different spatial scales and orientations which has been amplified, and thus the resulting images produced by summing the subbands and/or related functions of the images will contain amplified and measurable motion. In some examples, a motion-amplified sequence of image may be produced. The process 400 may then continue to an act of determining the acoustic vector, such as act 310 of FIG. 3.

At act 410, the phases (e.g., frequencies) are multiplied by an amplification factor. The amplified phase differences of the result of the multiplication are then used to modify phases of coefficients of equations of motion for each frame of the video (or each image in the image sequence). The process 400 may then continue to act 412.

At act 412, the controller determines one or more acoustic vectors within the fluid. For example, the controller may determine the general direction and magnitude of forces acting on and/or within the fluid. The controller may determine the one or more acoustic vectors by analyzing the amplified motion of particulates within the motion-amplified sequences of images. For example, a particulate being acted upon by a force may occupy a first coordinate in space at a first time and a second coordinate in space at a second time. By charting the motion of particulate from the first time to the second time, the controller may derive a vector describing the particulate's motion. By performing a similar analysis for each particulate in the sequence of images, the controller may determine the overall characteristics of the force or forces operating on and/or within the fluid.

For example, with respect to act 412, the controller may determine the acoustic vector by accounting for overall motion of the particulates compared to vibrational motion of the particulates. That is, the particulates may generally move in a given direction or set of directions on a macro scale. As the particulates move, they may jostle, vibrate, or otherwise move back and forth on a small scale compared to their overall motion. The small scale vibrational motion may be made visible by the phase amplification and multiplication acts, such as those described with respect to acts 404-408. This motion may be modeled as $v(t)+\Delta v$, where $v(t)$ describes the overall motion of the particulate(s) and $\Delta v$ represents the vibrational motion of the particulate(s) (e.g., the small scale motion of the particulate(s)). As velocity is proportional to pressure, the controller may derive a directional acoustic field for the particulates, as opposed to a point measurement of pressure without a vector.

In an embodiment, a system includes one or more devices, including one or more hardware processors, that are configured to perform any of the operations described herein and/or recited in any of the claims.

In an embodiment, one or more non-transitory computer-readable storage media store instructions that, when executed by one or more hardware processors, cause performance of any of the operations described herein and/or recited in any of the claims.

Any combination of the features and functionalities described herein may be used in accordance with an embodiment. In the foregoing specification, embodiments have been described with reference to numerous specific details that may vary from implementation to implementation. Accordingly, the specification and figures are to be regarded in an illustrative rather than a restrictive sense. The sole and exclusive indicator of the scope of the invention, and what is intended by the Applicant to be the scope of the invention, is the literal and equivalent scope of the set of claims that issue from this application, in the specific form in which such claims issue, including any subsequent correction.

In an embodiment, techniques described herein are implemented by one or more special-purpose computing devices (i.e., computing devices specially configured to perform certain functionality). The special-purpose computing device(s) may be hard-wired to perform the techniques and/or may include digital electronic devices such as one or more application-specific integrated circuits (ASICs), field programmable gate arrays (FPGAs), and/or network processing units (NPUs) that are persistently programmed to perform the techniques. Alternatively or additionally, a computing device may include one or more general-purpose hardware processors programmed to perform the techniques pursuant to program instructions in firmware, memory, and/or other storage. Alternatively or additionally, a special-purpose computing device may combine custom hard-wired logic, ASICs, FPGAs, or NPUs with custom programming to accomplish the techniques. A special-purpose computing device may include a desktop computer system, portable computer system, handheld device, networking device, and/or any other device(s) incorporating hard-wired and/or program logic to implement the techniques.

For example, FIG. 8 is a block diagram of an example of a computer system 500 according to an embodiment. Computer system 500 includes a bus 502 or other communication mechanism for communicating information, and a hardware processor 504 coupled with the bus 502 for processing information. Hardware processor 504 may be a general-purpose microprocessor.

Computer system 500 also includes a main memory 506, such as a random access memory (RAM) or other dynamic storage device, coupled to bus 502 for storing information and instructions to be executed by processor 504. Main memory 506 also may be used for storing temporary variables or other intermediate information during execution of instructions to be executed by processor 504. Such instructions, when stored in one or more non-transitory storage media accessible to processor 504, render computer system 500 into a special-purpose machine that is customized to perform the operations specified in the instructions.

Computer system 500 further includes a read only memory (ROM) 508 or other static storage device coupled to bus 502 for storing static information and instructions for processor 504. A storage device 510, such as a magnetic disk or optical disk, is provided and coupled to bus 502 for storing information and instructions.

Computer system 500 may be coupled via bus 502 to a display 512, such as a liquid crystal display (LCD), plasma display, electronic ink display, cathode ray tube (CRT) monitor, or any other kind of device for displaying information to a computer user. An input device 514, including alphanumeric and other keys, may be coupled to bus 502 for communicating information and command selections to processor 504. Alternatively or additionally, computer system 500 may receive user input via a cursor control 516, such as a mouse, a trackball, a trackpad, or cursor direction keys for communicating direction information and command selections to processor 504 and for controlling cursor movement on display 512. This input device typically has two degrees of freedom in two axes, a first axis (e.g., x) and a second axis (e.g., y), that allows the device to specify positions in a plane. Alternatively or additionally, computer system 8 may include a touchscreen. Display 512 may be configured to receive user input via one or more pressure-sensitive sensors, multi-touch sensors, and/or gesture sensors. Alternatively or additionally, computer system 500 may receive user input via a microphone, video camera, and/or some other kind of user input device (not shown).

Computer system 500 may implement the techniques described herein using customized hard-wired logic, one or more ASICs or FPGAs, firmware, and/or program logic which in combination with other components of computer system 500 causes or programs computer system 500 to be a special-purpose machine. According to one embodiment, the techniques herein are performed by computer system 500 in response to processor 504 executing one or more sequences of one or more instructions contained in main memory 506. Such instructions may be read into main memory 506 from another storage medium, such as storage device 510. Execution of the sequences of instructions contained in main memory 506 causes processor 504 to perform the process steps described herein. Alternatively or additionally, hard-wired circuitry may be used in place of or in combination with software instructions.

The term "storage media" as used herein refers to one or more non-transitory media storing data and/or instructions that cause a machine to operate in a specific fashion. Such storage media may comprise non-volatile media and/or volatile media. Non-volatile media includes, for example, optical or magnetic disks, such as storage device 510. Volatile media includes dynamic memory, such as main memory 506. Common forms of storage media include, for example, a floppy disk, a flexible disk, hard disk, solid state drive, magnetic tape or other magnetic data storage medium, a CD-ROM or any other optical data storage medium, any physical medium with patterns of holes, a RAM, a programmable read-only memory (PROM), an erasable PROM (EPROM), a FLASH-EPROM, non-volatile random-access memory (NVRAM), any other memory chip or cartridge, content-addressable memory (CAM), and ternary content-addressable memory (TCAM).

A storage medium is distinct from but may be used in conjunction with a transmission medium. Transmission media participate in transferring information between storage media. Examples of transmission media include coaxial cables, copper wire, and fiber optics, including the wires that comprise bus 502. Transmission media may also take the form of acoustic or light waves, such as those generated during radio-wave and infra-red data communications.

Various forms of media may be involved in carrying one or more sequences of one or more instructions to processor 504 for execution. For example, the instructions may initially be carried on a magnetic disk or solid state drive of a remote computer. The remote computer may load the instructions into its dynamic memory and send the instructions over a network, via a network interface controller (NIC), such as an Ethernet controller or Wi-Fi controller. A NIC local to computer system 500 may receive the data from the network and place the data on bus 502. Bus 502 carries the data to main memory 506, from which processor 504 retrieves and executes the instructions. The instructions received by main memory 506 may optionally be stored on storage device 510 either before or after execution by processor 504.

Computer system 500 also includes a communication interface 518 coupled to bus 502. Communication interface 518 provides a two-way data communication coupling to a network link 520 that is connected to a local network 522. For example, communication interface 518 may be an integrated services digital network (ISDN) card, cable modem, satellite modem, or a modem to provide a data communication connection to a corresponding type of telephone line. As another example, communication interface 518 may be a local area network (LAN) card to provide a data communication connection to a compatible LAN. Wireless links may also be implemented. In any such implementation, communication interface 518 sends and receives electrical, electromagnetic or optical signals that carry digital data streams representing various types of information.

Network link 520 typically provides data communication through one or more networks to other data devices. For example, network link 520 may provide a connection through local network 522 to a host computer 524 or to data equipment operated by an Internet Service Provider (ISP) 526. ISP 526 in turn provides data communication services through the world wide packet data communication network now commonly referred to as the "Internet" 528. Local network 522 and Internet 528 both use electrical, electromagnetic or optical signals that carry digital data streams. The signals through the various networks and the signals on network link 520 and through communication interface 518, which carry the digital data to and from computer system 500, are example forms of transmission media.

Computer system 500 can send messages and receive data, including program code, through the network(s), network link 520 and communication interface 518. In the Internet example, a server 830 might transmit a requested code for an application program through Internet 528, ISP 526, local network 522, and communication interface 518.

The received code may be executed by processor 504 as it is received, and/or stored in storage device 510, or other non-volatile storage for later execution.

Various controllers, such as the controller 206, may execute various operations discussed above. Using data stored in associated memory and/or storage, the controller 206 also executes one or more instructions stored on one or more non-transitory computer-readable media, which the controller 206 may include and/or be coupled to, that may result in manipulated data. In some examples, the controller 206 may include one or more processors or other types of controllers. In one example, the controller 206 is or includes at least one processor. In another example, the controller 206 performs at least a portion of the operations discussed above using an application-specific integrated circuit tailored to perform particular operations in addition to, or in lieu of, a general-purpose processor. As illustrated by these examples, examples in accordance with the present disclosure may perform the operations described herein using many specific combinations of hardware and software and the disclosure is not limited to any particular combination of hardware and software components. Examples of the disclosure may include a computer-program product configured to execute methods, processes, and/or operations discussed above. The computer-program product may be, or include, one or more controllers and/or processors configured to execute instructions to perform methods, processes, and/or operations discussed above.

Having thus described several aspects of at least one embodiment, it is to be appreciated various alterations, modifications, and improvements will readily occur to those skilled in the art. Such alterations, modifications, and improvements are intended to be part of, and within the spirit and scope of, this disclosure. Accordingly, the foregoing description and drawings are by way of example only.

What is claimed is:

1. A system for measuring acoustic wave vectors in a fluid, the system comprising:
    a first camera and a second camera, each configured to be placed in the fluid to record any movement of at least one particle suspended in the fluid in response to any disturbance of the fluid by an acoustic wave;
    a light source configured to be placed in the fluid; and
    a controller configured to:
    control the first camera;
    control the second camera;
    control the light source;
    process images provided by the first camera and second camera to determine an acoustic wave vector of the acoustic wave based on the measurement movement of the at least one particle.

2. The system of claim 1 wherein processing images to determine an acoustic wave vector includes:
    receiving one or more first images of a scene from the first camera, each image corresponding to a first perspective; and
    receiving one or more second images of the scene from the second camera, each image corresponding to a second perspective.

3. The system of claim 2 wherein processing images to determine an acoustic wave vector includes:
    decomposing the one or more first and second images into a plurality of subbands;
    amplifying a phase of at least one subband of the plurality of subbands; and
    combining one or more of the plurality of subbands into one or more third images.

4. The system of claim 3 wherein processing images to determine an acoustic wave vector includes:
    identifying one or more particulates in the third images;
    responsive to identifying the one or more particulates, determining motion of the one or more particulates; and
    based on the motion of the one or more particulates, determining an acoustic wave vector corresponding to at least one of the one or more particulates.

5. The system of claim 1 wherein the second camera is rotated relative to the first camera.

6. The system of claim 5 wherein the second camera is rotated 90 degrees relative to the first camera.

7. The system of claim 1 wherein the light source is configured to selectively provide light to a scene.

8. The system of claim 7 wherein the light is adequate to illuminate at least one particulate in the scene.

9. An Acoustic Vector Sensor (AVS), comprising:
    a plurality of high-definition video cameras, each configured to be used in fluid to record over a small area any movement of at least one particle suspended in the fluid so as to record any object movement in response to any disturbance of the fluid by an acoustic wave within the small area between the video cameras; and
    a processing device configured to process images of the particles to determine an acoustic intensity vector of the acoustic wave based on the measured movement of the particle.

10. The AVS of claim 9, further comprising a source of light to illuminate the at least one particle.

11. The AVS of claim 9, wherein the video cameras are configured for use in fluid.

12. The AVS of claim 9, wherein the processing device is configured to process the images to determine an acoustic wave vector includes:
    receiving one or more first images of a scene from a first camera, each image corresponding to a first perspective;
    receiving one or more second images of the scene from a second camera, each image corresponding to a second perspective;
    decomposing the one or more first and second images into a plurality of subbands;
    amplifying a phase of at least one subband of the plurality of subbands;
    combining one or more of the plurality of subbands into one or more third images;
    identifying one or more particulates in the third images;
    responsive to identifying the one or more particulates, determining motion of the one or more particulates; and
    based on the motion of the one or more particulates, determining an acoustic wave vector corresponding to the motion of at least one of the one or more particulates.

13. The AVS of claim 9, further comprising a controller configured to control a first camera and a second camera, and control the light source.

14. A method of determining an acoustic wave vector comprising:
    controlling a light source to illuminate a volume of a fluid;
    controlling a first camera to capture one or more first images of the volume;
    controlling a second camera to capture one or more second images of the volume, wherein the one or more first images and the one or more second images record any movement of at least one particle suspended in the fluid in response to any disturbance of the fluid by an acoustic wave; and
    process the one or more first images and the one or more second images to determine an acoustic wave vector of at least one particulate in the volume of the fluid.

15. The method of claim 14 wherein processing the one or more first images and the one or more second images further comprises:
    decomposing the one or more first images and the one or more second images into a plurality of subbands;
    amplifying a phase of at least one subband of the plurality of subbands; and
    combining one or more of the subbands of the plurality of subbands into one or more third images.

16. The method of claim 15 wherein processing the one or more first images and the one or more second images further comprises:
    identifying one or more particulates in the one or more third images;
    responsive to identifying the one or more particulates, determining motion of the one or more particulates; and
    based on the motion of the one or more particulates, determining an acoustic wave vector corresponding to the one or more particulates.

17. The method of claim 16 wherein the acoustic wave vector is determined at least in part by determining a vector based on a first position of at least one of the one or more particulates and a second position of the at least one of the one or more particulates, wherein the first position corresponds to a first time and the second position corresponds to a second time after the first time.

18. A method of determining an acoustic wave vector comprising:
    controlling a plurality of video cameras to capture one or more images of particulates located within a volume of fluid;

amplifying any motion of the particulates caused by an acoustic wave within the volume of the fluid; and determining an acoustic intensity vector of the acoustic wave based on amplified motion of the particulates and at least two of the one or more images.

19. The method of claim 18 further comprising activating a light source to illuminate at least one of the particulates.

20. The method of claim 18 further comprising:

decomposing the one or more first and second images into a plurality of subbands;

amplifying a phase of at least one subband of the plurality of subbands;

combining one or more of the plurality of subbands into one or more third images;

identifying one or more particulates in the third images;

responsive to identifying the one or more particulates, determining motion of the one or more particulates; and based on the motion of the one or more particulates, determining an acoustic wave vector corresponding to the motion of at least one of the one or more particulates.

* * * * *

UNITED STATES PATENT AND TRADEMARK OFFICE
CERTIFICATE OF CORRECTION

PATENT NO. : 12,462,401 B2
APPLICATION NO. : 18/219328
DATED : November 4, 2025
INVENTOR(S) : Caitlin C. Bogdan Page 1 of 1

It is certified that error appears in the above-identified patent and that said Letters Patent is hereby corrected as shown below:

In the Specification

In Column 4, Line 37, delete "a," and insert --α,-- therefor

In Column 4, Line 41, delete "a," and insert --α,-- therefor

In Column 4, Line 46, delete "a," and insert --α,-- therefor

In Column 4, Line 59, delete "a." and insert --α.-- therefor

In Column 5, Line 14, delete "102" and insert --104-- therefor

In Column 5, Line 14, delete "104," and insert --102,-- therefor

Signed and Sealed this
Twentieth Day of January, 2026

John A. Squires
*Director of the United States Patent and Trademark Office*